United States Patent
Chu et al.

(10) Patent No.: US 10,249,250 B2
(45) Date of Patent: Apr. 2, 2019

(54) BACKLIGHT CONTROL METHOD, BACKLIGHT MODULE AND DISPLAY APPARATUS

(71) Applicant: BOE TECHNOLOGY GROUP CO., LTD., Beijing (CN)

(72) Inventors: Yifang Chu, Beijing (CN); Chul Gyu Jung, Beijing (CN); Shou Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 15/528,744

(22) PCT Filed: Aug. 5, 2016

(86) PCT No.: PCT/CN2016/093539
§ 371 (c)(1),
(2) Date: May 22, 2017

(87) PCT Pub. No.: WO2017/161797
PCT Pub. Date: Sep. 28, 2017

(65) Prior Publication Data
US 2018/0061333 A1 Mar. 1, 2018

(30) Foreign Application Priority Data
Mar. 25, 2016 (CN) .......................... 2016 1 0178057

(51) Int. Cl.
*G09G 3/34* (2006.01)
*G02F 1/1335* (2006.01)
*G09G 3/36* (2006.01)

(52) U.S. Cl.
CPC ..... *G09G 3/3406* (2013.01); *G02F 1/133603* (2013.01); *G09G 3/34* (2013.01);
(Continued)

(58) Field of Classification Search
CPC ............... G09G 3/3611; G09G 3/3607; G09G 2360/16; G09G 2320/066; G09G 2320/0626
See application file for complete search history.

(56) References Cited

U.S. PATENT DOCUMENTS

2006/0109389 A1* 5/2006 Ichikawa ............... G09G 3/342
349/1
2007/0103418 A1* 5/2007 Ogino .................. G09G 3/3406
345/89
(Continued)

FOREIGN PATENT DOCUMENTS

CN 101206837 A 6/2008
CN 101354875 A 1/2009
(Continued)

OTHER PUBLICATIONS

International Search Report and Written Opinion dated Dec. 22, 2017 for corresponding PCT Application No. PCT/CN2016/093539.
(Continued)

*Primary Examiner* — Shaheda A Abdin
(74) *Attorney, Agent, or Firm* — Kinney & Lange, P.A.

(57) ABSTRACT

A backlight control method, a backlight module and a display apparatus are disclosed. The backlight control method comprises: dividing a backlight into N blocks; determining whether each of the N blocks satisfies a high current driving start-up condition or not according to a pixel signal in each input frame of image signal and determining blocks which satisfy the high current driving start-up condition as candidate blocks; setting blocks among the candidate blocks which are determined to be driven by high current as selected blocks in a case that power consumption of each frame of picture does not exceed total backlight power consumption without dynamic backlight control; and
(Continued)

calculating backlight driving pulse width modulation duty ratios of the selected blocks according to a correspondence between brightness and pulse width modulation duty ratios, and transmitting the calculated backlight driving pulse width modulation duty ratios to a backlight driving circuit.

20 Claims, 7 Drawing Sheets

(52) U.S. Cl.
CPC ......... *G09G 3/3607* (2013.01); *G09G 3/3611* (2013.01); *G09G 2320/066* (2013.01); *G09G 2320/0626* (2013.01); *G09G 2360/16* (2013.01)

(56) References Cited

U.S. PATENT DOCUMENTS

| | | |
|---|---|---|
| 2007/0296679 A1 | 12/2007 | Kang et al. |
| 2010/0128051 A1* | 5/2010 | Mizuta .................. G09G 3/3413 345/589 |
| 2011/0193895 A1* | 8/2011 | Johnson ............... G09G 3/3426 345/690 |
| 2015/0228219 A1* | 8/2015 | Noiman ................... G09G 3/32 345/102 |

FOREIGN PATENT DOCUMENTS

| | | |
|---|---|---|
| CN | 101393723 A | 3/2009 |
| CN | 102543013 A | 7/2012 |
| CN | 102708810 A | 10/2012 |
| CN | 102763155 A | 10/2012 |
| CN | 104050934 A | 9/2014 |
| CN | 105390096 A | 3/2016 |
| CN | 105575343 A | 5/2016 |
| CN | 104332140 A | 4/2017 |

OTHER PUBLICATIONS

Second Chinese Office Action, for Chinese Patent Application No. 201610178057.X, dated Jan. 12, 2018, 12 pages.

* cited by examiner

BACKLIGHT CONTROL METHOD, BACKLIGHT MODULE AND DISPLAY APPARATUS

CROSS-REFERENCE TO RELATED APPLICATION(S)

This application is a Section 371 National Stage Application of PCT International Application No. PCT/CN2016/093539, which claims priority to the Chinese Patent Application No. 201610178057.X, filed on Mar. 25, 2016, which is incorporated herein by reference in its entirety.

TECHNICAL FIELD

Embodiments of the present disclosure relate to the technical field of displays, and more particularly, to a backlight control method, a backlight module and a display apparatus comprising the backlight module.

BACKGROUND

In order to reduce the power consumption of liquid crystal televisions and improve the contrast thereof, a dynamic backlight control method, i.e., a local backlight control (also called local dimming) method, is generally used to divide backlight Liquid Emitting Diodes (LEDs) into several regions, and LEDs in each region are individually controlled according to average display brightness of a picture. This conventional method has disadvantages in that different numbers of backlight blocks have different display brightness. For example, brightness of one LED block when the LED block is lighted up is different from brightness of two LED blocks when the two LED blocks are lighted up. As shown in FIG. 9, for an L255 gray-scale picture, when one LED block is fully lighted up, brightness of a unit is measured to be 200 nits, and when two LED blocks are fully lighted up, the brightness of the unit is measured to be 300 nits, which results in a difference between display brightness.

The conventional local backlight control method only carries out analysis on input data for picture brightness, and then carries out driving of the backlight LEDs, which results in reduction in the picture contrast and the display effects.

SUMMARY

Embodiments of the present disclosure provide a dynamic backlight control method, a backlight module and a display apparatus.

According to an aspect of the embodiments of the present disclosure, there is provided a backlight control method, comprising:

dividing a backlight into N blocks, where N is an integer greater than 1;

determining whether each of the N blocks satisfies a high current driving start-up condition or not according to a pixel signal in each input frame of image signal, and determining blocks which satisfy the high current driving start-up condition as candidate blocks;

setting blocks among the candidate blocks which are determined to be driven by high current as selected blocks in a case that power consumption of each frame of picture does not exceed total backlight power consumption without dynamic backlight control; and acquiring backlight driving pulse width modulation duty ratios of the selected blocks according to a correspondence between brightness and pulse width modulation duty ratios, and transmitting the acquired backlight driving pulse width modulation duty ratios to a backlight driving circuit, to respectively drive the respective selected blocks in the backlight.

In an example, the pixel signal comprises a RGB pixel signal or a RGBW pixel signal.

In an example, determining blocks which satisfy the high current driving start-up condition as candidate blocks comprises:

calculating brightness of various pixels in a block in turn according to the pixel signal;

determining whether the brightness of the pixel is greater than a threshold A or not, and if not, returning to the step of calculating brightness of pixels; and if so, increasing a count value of a pixel counter by 1; and calculating total brightness $L_{bn}$ of the block when the count value is greater than or equal to a threshold B, and determining the block as a candidate block in a case that the total brightness $L_{bn}$ is greater than or equal to a threshold C and a brightness difference between the block and an adjacent block is greater than or equal to a threshold D.

In an example, determining blocks which satisfy the high current driving start-up condition as candidate blocks further comprises:

setting the block as a non-candidate block if the count value is less than the threshold B after all the pixels in the block are processed.

In an example, determining blocks which satisfy the high current driving start-up condition as candidate blocks further comprises:

if the total brightness $L_{bn}$ is less than the threshold C and the brightness difference between the block and the adjacent block is less than the threshold D, setting the block as a non-candidate block.

In an example, setting blocks among the candidate blocks which are determined to be driven by high current as selected blocks comprises:

calculating a pulse width modulation duty ratio $P_{total}$ of the backlight without dynamic backlight control;

acquiring a pulse width modulation duty ratio corresponding to brightness of each non-candidate block, summing up pulse width modulation duty ratios of all the non-candidate blocks to acquire $\Sigma P$, and calculating a difference value $\Delta P$ between the pulse width modulation duty ratio $P_{total}$ and $\Sigma P$; and acquiring a pulse width modulation duty ratio corresponding to brightness of each candidate block, summing up pulse width modulation duty ratios of all the candidate blocks in a descending order of the pulse width modulation duty ratios of the candidate blocks, until a cumulative sum value is closest to the difference value $\Delta P$ and is less than or equal to the difference value $\Delta P$, and setting candidate blocks of which pulse width modulation duty ratios are summed up as the selected blocks.

In an example, a pulse width modulation duty ratio corresponding to brightness of each non-candidate block and a pulse width modulation duty ratio corresponding to brightness of each candidate block are acquired respectively through a lookup table.

In an example, a value of the pulse width modulation duty ratio corresponding to the brightness is accurate to thousands.

In an example, a backlight characteristic curve of the backlight comprises a Gamma2.2 backlight characteristic curve, a fold line-shaped backlight characteristic curve, or an S-shaped backlight characteristic curve.

In an example, the backlight is a Light Emitting Diode (LED) light source.

According to another aspect of the embodiments of the present disclosure, there is provided a backlight module, comprising:

a block division unit configured to divide a backlight into N blocks, where N is an integer greater than 1;

a candidate block determination unit configured to determine whether each of the N blocks satisfies a high current driving start-up condition or not according to a pixel signal in each input frame of signal and set blocks which satisfy the high current driving start-up condition as candidate blocks;

a selected block setting unit configured to set blocks among the candidate blocks which are determined to be driven by high current as selected blocks in a case that power consumption of each frame of picture does not exceed total backlight power consumption without dynamic backlight control; and a calculation unit configured to calculate backlight driving pulse width modulation duty ratios of the selected blocks according to a correspondence between brightness and pulse width modulation duty ratios, and transmit the calculated backlight driving pulse width modulation duty ratios to a backlight driving circuit, to respectively drive the respective selected blocks in the backlight.

In an example, the candidate block determination unit comprises:

a pixel brightness calculation unit configured to calculate brightness of a pixel in a block according to the pixel signal;

a first comparison unit configured to compare the brightness of the pixel with a threshold A;

a counting unit configured to increase a count value by 1 when the brightness of the pixel is greater than the threshold A;

a second comparison unit configured to compare the count value with a threshold B;

total brightness calculation unit configured to calculate total brightness $L_{bn}$ of pixels in the block;

a third comparison unit configured to compare the total brightness $L_{bn}$ with a threshold C;

a brightness difference calculation unit configured to calculate a brightness difference between the total brightness $L_{bn}$ and total brightness of an adjacent block in a case that the total brightness $L_{bn}$ is greater than the threshold C; and a fourth comparison unit configured to compare the brightness difference with a threshold D and set the block as a candidate block in a case that the brightness difference is greater than the threshold D.

In an example, the candidate block determination unit further comprises:

a non-candidate block determination unit configured to set the block as a non-candidate block if the count value is less than the threshold B after all pixels in the block are processed.

In an example, the non-candidate block determination unit is further configured to set the block as a non-candidate block if the total brightness $L_{bn}$ is less than the threshold C or the brightness difference between the block and the adjacent block is less than the threshold D.

In an example, the selected block setting unit comprises:

a pulse width modulation duty ratio calculation unit configured to calculate a pulse width modulation duty ratio $P_{total}$ of the backlight without dynamic backlight control;

a difference value calculation unit configured to acquire a pulse width modulation duty ratio corresponding to brightness of each non-candidate block, sum up pulse width modulation duty ratios of all the non-candidate blocks to acquire $\Sigma P$, and calculate a difference value $\Delta P$ between the pulse width modulation duty ratio $P_{total}$ and $\Sigma P$; and a setting unit configured to acquire a pulse width modulation duty ratio corresponding to brightness of each candidate block, sum up pulse width modulation duty ratios of all the candidate blocks in a descending order of the pulse width modulation duty ratios of the candidate blocks, until a cumulative sum value is closest to the difference value $\Delta P$ and is less than or equal to the difference value $\Delta P$, and set candidate blocks of which pulse width modulation duty ratios are summed up as the selected blocks.

In an example, the difference value calculation unit and the setting unit acquire a pulse width modulation duty ratio corresponding to brightness of each non-candidate block and a pulse width modulation duty ratio corresponding to brightness of each candidate block respectively through a lookup table.

In an example, the block division unit, the candidate block determination unit, the selected block setting unit and the calculation unit are implemented with a Field Programmable Gate Array (FPGA) chip.

In an example, the backlight is a Liquid Emitting Diode (LED) light source.

According to another aspect of the embodiments of the present disclosure, there is provided a display apparatus, comprising the backlight module according to any of the aspects described above.

In an example, the display apparatus is a high dynamic range display apparatus.

DETAILED DESCRIPTION

In order to make the purposes, technical solutions and advantages of the present disclosure more clear and apparent, the present disclosure will be described in further detail below in conjunction with specific embodiments with reference to accompanying drawings.

With the backlight control method, the backlight module and the display apparatus according to the embodiments of the present disclosure, local backlight control is realized by determining whether each block satisfies a high current driving start-up condition, which increases the picture contrast; and the display effects of the picture are also improved while increasing the contrast by determining a final number of blocks for which high current driving is performed.

According to the embodiments of the present disclosure, the display capability of the display in a High Dynamic Range (HDR) is fully utilized by realizing matching of an input picture with an HDR display, which improves the display effects and the contrast.

Figure 1:
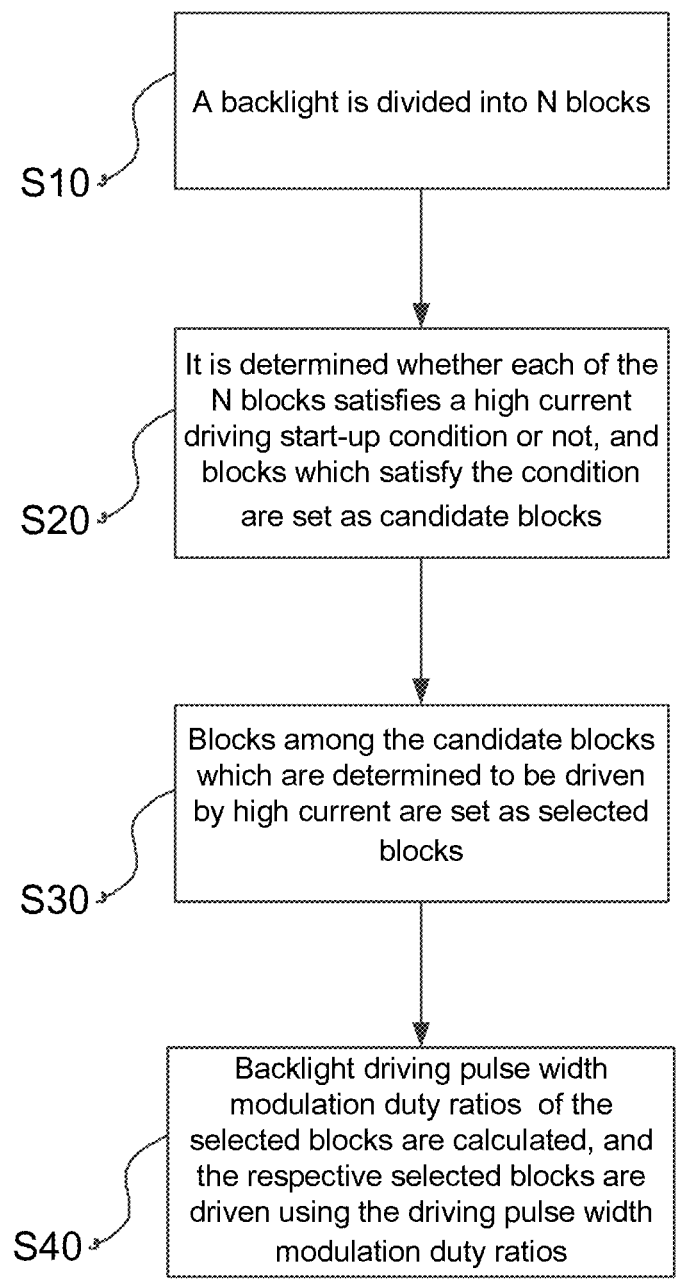
FIG. 1 is a flowchart of a dynamic backlight control method according to an embodiment of the present disclosure.

FIG. 1 is a flowchart of a dynamic backlight control method according to an embodiment of the present disclosure. As shown in FIG. 1, the backlight control method according to the embodiment of the present disclosure comprises the following steps.

In step S10, a backlight is divided into N blocks.

In step S20, it is determined whether each of the N blocks satisfies a high current driving start-up condition or not according to a pixel signal in each input frame of image signal, and blocks which satisfy the high current driving start-up condition are determined as candidate blocks.

In step S30, in a case that power consumption of each frame of picture does not exceed total backlight power consumption without dynamic backlight control, blocks among the candidate blocks which are determined to be driven by high current are set as selected blocks.

In step S40, backlight driving pulse width modulation duty ratios of the selected blocks are calculated according to a correspondence between brightness and pulse width modulation duty ratios, and the calculated backlight driving pulse width modulation duty ratios are transmitted to a backlight driving circuit, to respectively drive the respective selected blocks in the backlight.

Each partition may be referred to as a block. In the following, the terms "block" and "partition" refer to the same technical feature. Firstly, it is determined whether each of the backlight blocks satisfies the high current driving (peak) start-up condition or not, that is, candidate blocks are determined. Then, a number of blocks which can be driven by high current is determined according to average brightness and power consumption of each block, so that power consumption of each frame of picture does not exceed power consumption of a white picture without dynamic backlight control. Then, a backlight driving Pulse Width Modulation (PWM) duty ratio of each backlight block which can be driven by high current is determined and transmitted to an LED driver Integration Circuit (IC) of a Backlight Unit (BLU). The high current driving means that driving current corresponding to brightness of a block in the original input signal is increased in order to increase the brightness of the corresponding block. In the present implementation, the backlight is divided into N blocks, where N is an integer greater than 1, and N may be an integer greater than or equal to 4. A suitable number of blocks can be selected by those skilled in the art according to practical display effects, which will not be limited in the present disclosure.

Hereinafter, various steps of the present implementation and judgment approaches in the steps will be described in detail in connection with the accompanying drawings.

Preferably, the backlight comprises an LED light source.

Figure 2:
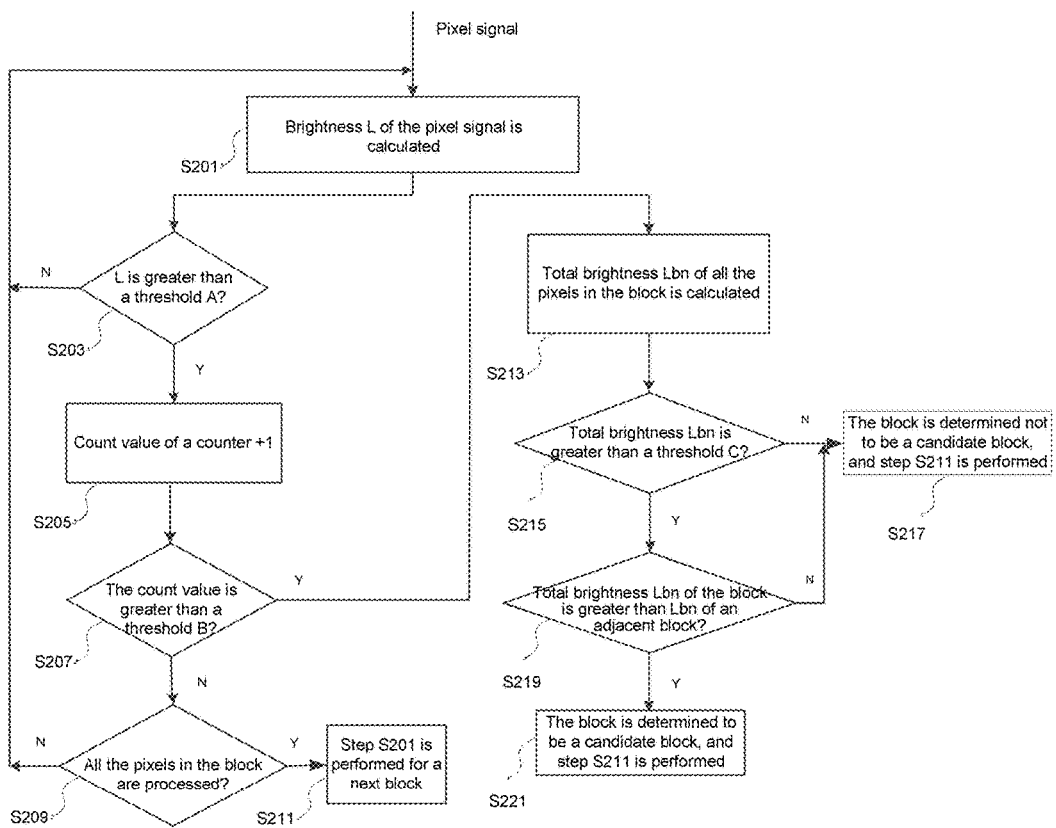
FIG. 2 is a flowchart of determination of candidate blocks according to an embodiment of the present disclosure.

FIG. 2 illustrates a flowchart of a method for determining candidate blocks according to a specific implementation of the present disclosure. It should be noted that serial numbers of various steps in the following method are used only as a representation of the steps for description and should not be considered as representing an execution order of the respective steps. Unless otherwise explicitly indicated, the method does not need to be executed exactly in the order shown; and similarly, multiple blocks may be executed in parallel, rather than sequentially. It is also to be understood that the method can also be implemented on a variety of devices.

As shown in FIG. 2, in step 201, a brightness value L of each pixel is calculated for data of the pixel in an input of a current block. For example, a calculation equation may be L=0.3R+0.59G+0.11B, and of course, the brightness value for the data of the pixel may be calculated in other manners known in the art.

In step S203, it is determined whether the brightness value L of the pixel is greater than a threshold A or not, and a value of A may be selected to be close to the maximum brightness value of 1, and may be selected in a range from 0.8 to 1. If L is not greater than the threshold A, the process returns to step 201 to calculate a brightness value of a next pixel. If L is greater than the threshold A, step S205 is performed in which a count value of a pixel counting unit is increased by 1. Of course, it will be appreciated by those skilled in the art that the pixel counter may be reset in various manners known in the art before processing a first pixel in each block.

In step S207, it is determined whether a current count value of the pixel counting unit is greater than a threshold B or not, for example, a value of B may be 30% to 50% of a total number of pixels in the block of the backlight.

If the current count value is not greater than the threshold B, step S209 is performed in which it is determined whether all the pixels in the current block have been processed or not. If so, step S211 is performed, in which it is determined that the current block is not a candidate block, i.e., being a non-candidate block, and step S201 is performed for a next block. If not, the process directly returns to step S201 to process a next pixel in the current block.

If the current count value is greater than the threshold B, step S213 is performed, in which total brightness $L_{bn}$ of all the pixels in the current block is calculated. In step S215, it is determined whether the total brightness $L_{bn}$ is greater than a threshold C or not. If $L_{bn}$ is greater than the threshold C, step S219 is performed, and if $L_{bn}$ is not greater than the threshold C, it is determined that the current block is a non-candidate block. Those skilled in the art can determine an appropriate threshold C according to a number of pixels corresponding to the block and brightness of a single pixel, which is not limited in the present disclosure.

In step S219, a brightness difference between the current block and an adjacent block is calculated, and when the brightness difference is greater than a threshold D, it is determined that the current block is a candidate block which can be driven by high current. Position coordinates of the block may be marked. For example, a value of the threshold D may be 0.08-0.12. The brightness difference between the current block and the adjacent block may be calculated in various manners known in the art. For example, the current block usually comprises a number (4 or 8) of adjacent blocks, and the brightness difference between the current block and a specific block may be calculated, or average brightness of some or all adjacent blocks may be calculated, and then a brightness difference between the brightness of the current block and the average brightness is calculated. Obviously, the embodiments of the present invention are not limited thereto.

Figure 3:
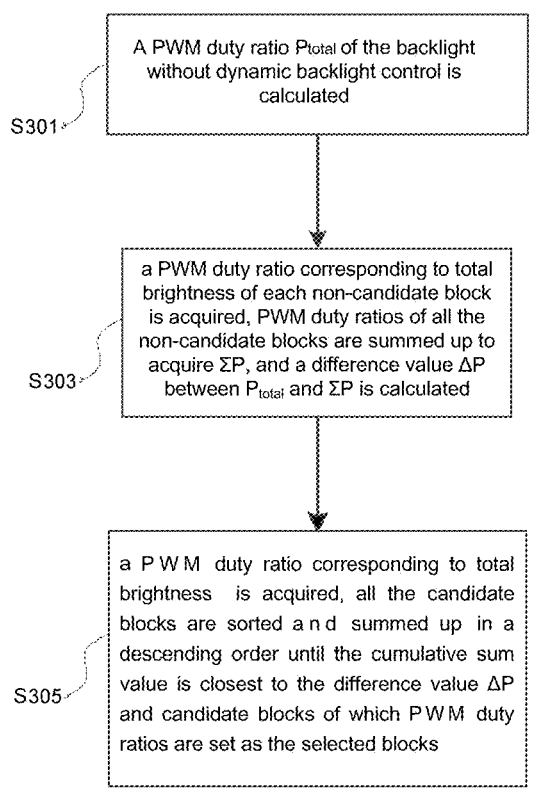
FIG. 3 is a flowchart of setting of selected blocks according to an embodiment of the present disclosure.

Next, a specific flowchart of setting of selected blocks according to an embodiment of the present disclosure will be described with reference to FIG. 3. Firstly, in step S301, a pulse width modulation duty ratio $P_{total}$ of P the backlight without dynamic backlight control is calculated. In step S303, a pulse width modulation duty ratio corresponding to total brightness of each non-candidate block is acquired, pulse width modulation duty ratios of all the non-candidate blocks are summed up to acquire ΣP, and a difference value ΔP between $P_{total}$ and ΣP is calculated. In step S305, a pulse width modulation duty ratio corresponding to total brightness of each candidate block is acquired, all the candidate blocks are sorted in a descending order of the pulse width modulation duty ratios during high current driving, corresponding pulse width modulation duty ratios are summed up in order to acquire a cumulative sum value $ΣP_{peak}$, until the cumulative sum value $ΣP_{peak}$ is closest to the difference value ΔP and is less than or equal to the difference value ΔP, that is, the cumulative sum value $ΣP_{peak}$ is less than or equal to ΔP and will exceed ΔP if a further pulse width modulation duty ratio is added thereto, and candidate blocks of which pulse width modulation duty ratios are summed up are set as the selected blocks.

Preferably, a value of the pulse width modulation duty ratio is accurate to thousands.

In the method for setting selected blocks according to an embodiment of the present disclosure, in order to enable the total power consumption of the backlight after being driven by high current to be less than or equal to the power consumption without dynamic backlight, it needs to firstly calculate a PWM duty ratio of the backlight without dynamic backlight control, which is defined as $P_{total}$. A lookup table of a relationship between brightness and PWM duty ratios may be preset, so that a PWM duty ratio corresponding to brightness of each non-candidate block is acquired by querying the lookup table. Also, the PWM duty ratio corresponding to brightness of each candidate block may be acquired by querying the lookup table.

Figures 4, 5A, 5B, 5C:
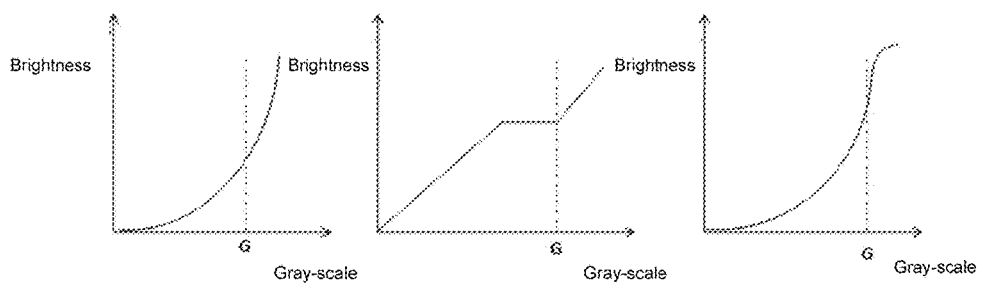
FIG. 4 is a diagram of blocks according to an embodiment of the present disclosure.
FIGS. 5A-5C are diagrams of example implementations of backlight brightness characteristic curves according to a specific implementation of the present disclosure.

FIG. 4 illustrates a diagram of blocks according to an embodiment of the present disclosure. As shown in FIG. 4, there are a total of 20 blocks in the figure, and it is assumed that 6 blocks which are P (1,1), P (1,3), P (1,5), P (4,1), P (4, 3) and P (4,5) can be driven by high current, i.e., the 6 blocks are candidate blocks. PWM duty ratios of remaining 14 blocks (i.e., non-candidate blocks) are summed up to acquire ΣP and a difference value ΔP between $P_{total}$ and ΣP is calculated. PWM Duty Ratios (PDRs) corresponding to brightness of various candidate blocks are acquired through a lookup table and are sorted in a descending order, as shown in Table 1. In the example in Table 1, brightness values of BLUs are from 0 to 500, in units of nits. In this example, it is assumed that a brightness value corresponding to a PWM duty ratio of 1 is 500 nits, and it will be understood by those skilled in the art that the brightness value corresponding to the PWM duty ratio of 1 may of course be another value.

TABLE 1

| Brightness of BLUs (nits) | PWM duty ratios | Position coordinates of blocks |
|---|---|---|
| 500 | 1 | P(1, 1) |
| 499 | 0.999 | P(1, 3) |
| 490 | 0.981 | P(4, 3) |
| 475 | 0.950 | P(4, 5) |
| 473 | 0.946 | P(1, 5) |
| 466 | 0.933 | P(4, 1) |

In order to avoid multiple blocks with the same pulse width modulation duty ratio, the backlight brightness and the PDR may be accurate to thousands. In the present example, assuming that the previously calculated ΔP is equal to 2.5, it is firstly determined whether the pulse width modulation duty ratio of 1 of P (1,1) having the maximum pulse width modulation duty ratio is greater than ΔP or not, and if not, the pulse width modulation duty ratio of 0.999 of P (1,3) having the second maximum pulse width modulation duty ratio is added thereto, i.e., 1+0.999=1.999, and then it is determined whether 1.999 is greater than ΔP or not, and if the value is still less than ΔP, the pulse width modulation duty ratio of 0.981 of P (4,3) having the third maximum pulse width modulation duty ratio continues to be added thereto, i.e., 1+0.999+0.981=2.98, and if the value is greater than ΔP, it indicates that the current total power consumption is greater than power consumption corresponding to $P_{total}$, and only first two blocks which are P (1,1) and P (1,3) are processed by high current driving.

When the selected blocks are driven by high current, various backlight characteristics curves may be defined to set a relationship between display gray-scales and brightness (or pulse width modulation duty ratios). For example, as shown in FIGS. 5A to 5C, a point G in the figure represents a threshold gray-scale or brightness for high current driving. FIG. 5A is a Gamma2.2 backlight characteristic curve, FIG. 5B is a fold line-shaped backlight characteristic curve, and FIG. 5C is an S-shaped backlight characteristic curve.

Figure 6:
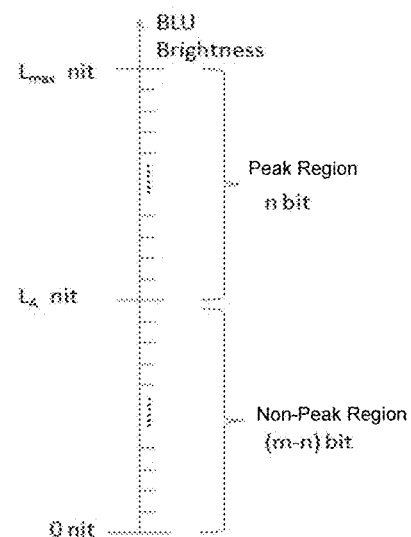
FIG. 6 is a diagram of a backlight data bit width according to a specific implementation of the present disclosure.

A data bit width of a pulse width modulation duty ratio corresponding to a block may be defined by users. The larger the bit width, the higher the controllable accuracy of the backlight, but the more the resources to be occupied. For example, in the example of FIG. 6, a total bit width is defined as m bits, where a data bit width of the selected blocks (high current driven blocks) is n bits, and a data bit width of the non-selected blocks (non-high current driven blocks) is (m-n) bits. In this figure, $L_A$ is threshold brightness for high current driving, and $L_{max}$ is maximum brightness for high current driving.

Figure 7:
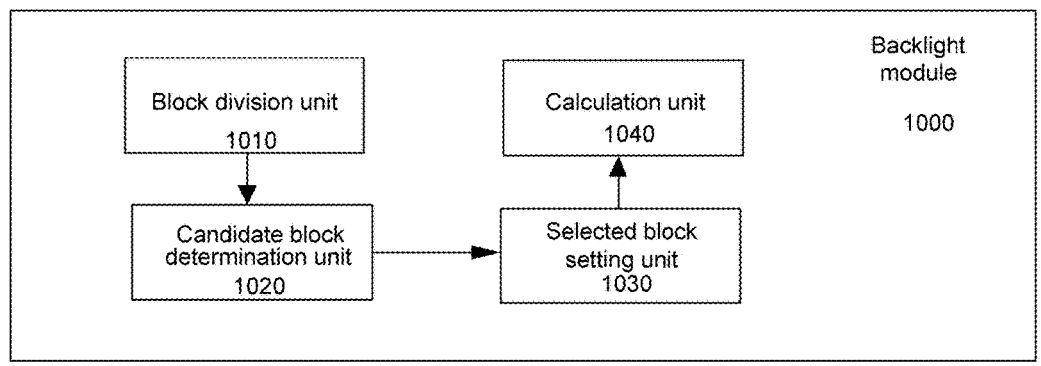
FIG. 7 is a structural block diagram of a backlight module according to an embodiment of the present disclosure.

According to another aspect of the embodiments of the present disclosure, there is provided a backlight module. As shown in FIG. 7, the backlight module 1000 comprises:

a block division unit 1010 configured to divide a backlight into N blocks, where N is an integer greater than 1;

a candidate block determination unit 1020 connected to the block division unit 1010 and configured to determine whether each of the N blocks satisfies a high current driving start-up condition or not according to a pixel signal in each input frame of signal and set blocks which satisfy the high current driving start-up condition as candidate blocks;

a selected block setting unit 1030 connected to the candidate block determination unit 1020 and configured to set blocks among the candidate blocks which are determined to be driven by high current as selected blocks; and a calculation unit 1040 connected to the selected block setting unit 1030 and configured to acquire backlight driving pulse width modulation duty ratios of the selected blocks according to a correspondence between brightness and pulse width modulation duty ratios, and transmit the acquired backlight driving pulse width modulation duty ratios to a backlight driving circuit, to respectively drive the respective selected blocks in the backlight.

Figure 8A:
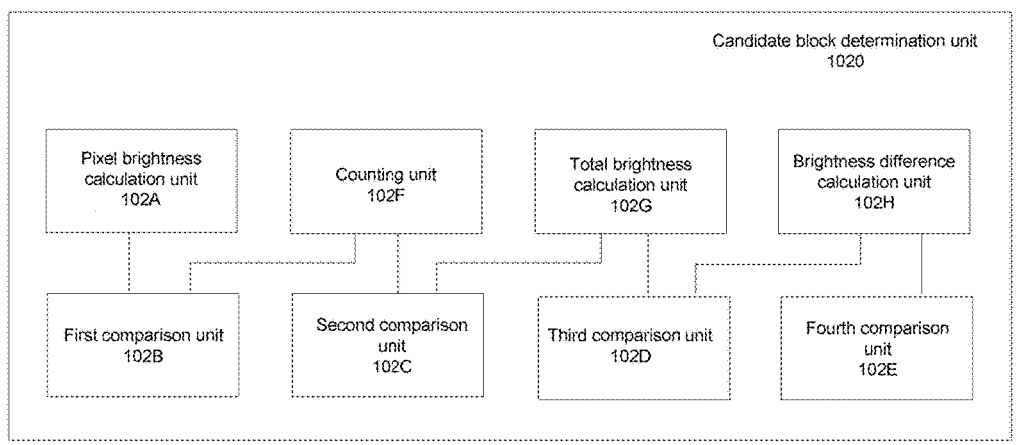
FIGS. 8A and 8B are structural block diagrams of a candidate block determination unit and a selected block setting unit in FIG. 7 respectively.

As shown in FIG. 8A, the candidate block determination unit 1020 may comprise:

a pixel brightness calculation unit 102A configured to calculate brightness of a pixel in a block according to the pixel signal;

a first comparison unit 102B connected to the pixel brightness calculation unit 102A and configured to compare the brightness of the pixel with a threshold A;

a counting unit 102F connected to the first comparison unit 102B and configured to increase a count value by 1 when the brightness of the pixel is greater than the threshold A;

a second comparison unit 102C connected to the counting unit 102F and configured to compare the count value with a threshold B;

total brightness calculation unit 102G connected to the second comparison unit 102C and configured to calculate total brightness $L_{bn}$ of pixels in the block;

a third comparison unit 102D connected to the total brightness calculation unit 102G and configured to compare the total brightness $L_{bn}$ with a threshold C;

a brightness difference calculation unit 102H connected to the third comparison unit 102D and configured to calculate a brightness difference between the total brightness $L_{bn}$ and total brightness of an adjacent block in a case that the total brightness $L_{bn}$ is greater than the threshold C; and a fourth comparison unit 102E connected to the brightness difference calculation unit 102H and configured to compare the brightness difference with a threshold D and set the block as a candidate block in a case that the brightness difference is greater than the threshold D.

Preferably, although not shown, the candidate block determination unit 1020 may further comprise: a non-candidate block determination unit connected to the second comparison unit 102C, the third comparison unit 102D and the fourth comparison unit 102E, and configured to set the block as a non-candidate block if the count value is less than the threshold B after all the pixels in the block are processed; and set the block as a non-candidate block if the total brightness $L_{bn}$ is less than the threshold C or the brightness difference between the block and the adjacent block is less than the threshold D.

Figure 8B:
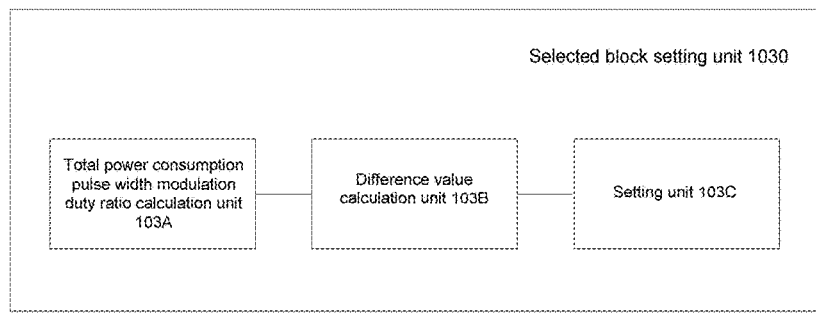
Figure 9:
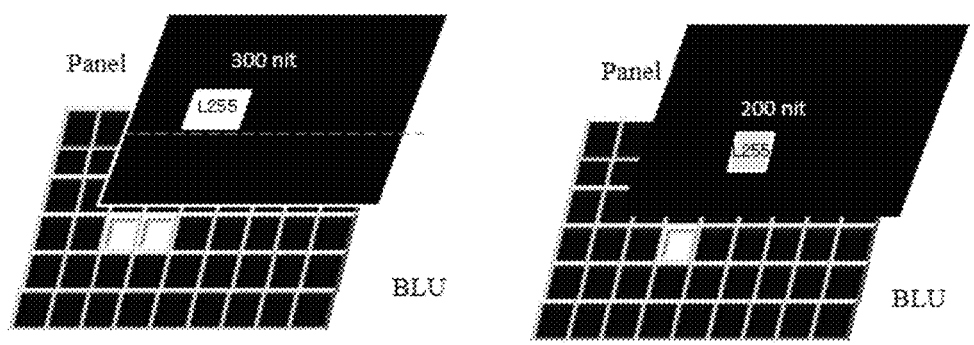
FIG. 9 is a diagram of brightness when different numbers of blocks are driven by high current in a conventional display apparatus.

Preferably, as shown in FIG. 8B, the selected block setting unit 1030 may comprise:

a pulse width modulation duty ratio calculation unit 103A configured to calculate a pulse width modulation duty ratio $P_{total}$ of the backlight without dynamic backlight control;

a difference value calculation unit 103B connected to the pulse width modulation duty ratio calculation unit 103A and configured to acquire a pulse width modulation duty ratio corresponding to brightness of each non-candidate block, sum up pulse width modulation duty ratios of all the non-candidate blocks to acquire ΣP, and calculate a difference value ΔP between the pulse width modulation duty ratio $P_{total}$ and ΣP; and a setting unit 103C connected to the difference value calculation unit 103B and configured to acquire a pulse width modulation duty ratio corresponding to brightness of each candidate block, sum up pulse width modulation duty ratios of all the candidate blocks in a descending order of the pulse width modulation duty ratios of the candidate blocks, until a cumulative sum value is closest to the difference value ΔP and is less than or equal to the difference value ΔP, and set candidate blocks of which pulse width modulation duty ratios are summed up as the selected blocks.

Preferably, the difference value calculation unit 103B and the setting unit 103C acquire a pulse width modulation duty ratio corresponding to brightness of each non-candidate block and a pulse width modulation duty ratio corresponding to brightness of each candidate block respectively through a lookup table.

Preferably, the block division unit, the candidate block determination unit, the selected block setting unit and the calculation unit are implemented with a Field Programmable Gate Array (FPGA) chip.

Preferably, the backlight comprises an LED light source.

According to another aspect of the embodiments of the present disclosure, there is provided a display apparatus comprising the backlight module according to the embodiments of the present disclosure. The display apparatus may be any product or component having a display function, such as a mobile phone, a tablet computer, a television set, a monitor, a notebook computer, a digital photo frame, a navigator etc. The implementations of the display apparatus can be known with reference to the implementations of the backlight module described above, and the description thereof will not be repeated.

The specific implementations described above further describe the purposes, technical solutions and beneficial effects of the present disclosure in further detail. It is to be understood that the above description is merely specific embodiments of the present disclosure, and are not used to limit the present disclosure. Any modification, equivalent substitution, improvement etc. made within the spirit and principle of the present disclosure should be included within the protection scope of the present disclosure.

We claim:

1. A backlight control method, comprising:
   dividing a backlight into N blocks, where N is an integer greater than 1;
   determining whether each of the N blocks satisfies a high current driving start-up condition or not according to a pixel signal in each input frame of image signal, and determining blocks which satisfy the high current driving start-up condition as candidate blocks;
   setting blocks among the candidate blocks which are determined to be driven by high current as selected blocks in a case that power consumption of each frame of picture does not exceed total backlight power consumption without dynamic backlight control; and
   calculating backlight driving pulse width modulation duty ratios of the selected blocks according to a correspondence between brightness and pulse width modulation duty ratios, and transmitting the calculated backlight driving pulse width modulation duty ratios to a backlight driving circuit, to respectively drive the respective selected blocks in the backlight;
   wherein setting blocks as selected blocks comprises:
      calculating a pulse width modulation ratio $P_{total}$ of the backlight without dynamic backlight control;
      summing up pulse width modulation duty ratios of all the non-candidate blocks based on the pulse width modulation ratio $P_{total}$; and
      setting the selected blocks based on the pulse width modulation ratio $P_{total}$, a sum of the pulse width modulation duty ratios of all the non-candidate blocks, and a pulse width modulation duty ratio corresponding to brightness of each candidate block.

2. The method according to claim 1, wherein the pixel signal comprises a RGB pixel signal or a RGBW pixel signal.

3. The method according to claim 2, wherein determining as candidate blocks further comprises:
   setting the block as a non-candidate block when the count value is less than the threshold B after all the pixels in the block are processed.

4. The method according to claim 2, wherein determining as candidate blocks further comprises:
   if the total brightness $L_{bn}$ is less than the threshold C and the brightness difference between the block and the adjacent block is less than the threshold D, setting the block as a non-candidate block.

5. The method according to claim 1, wherein determining as candidate blocks comprises:
   calculating brightness of a pixel in a block according to the pixel signal;

determining whether the brightness of the pixel is greater than a threshold A or not, and if not, returning to the step of calculating brightness of a single pixel; and if so, increasing a count value of a pixel counter by 1; and calculating total brightness $L_{bn}$ of the block when the count value is greater than or equal to a threshold B, and determining the block as a candidate block in a case that the total brightness $L_{bn}$ is greater than or equal to a threshold C and a brightness difference between the block and an adjacent block is greater than or equal to a threshold D.

6. The method according to claim 1, wherein setting blocks as selected blocks further comprises:

acquiring the pulse width modulation duty ratio corresponding to brightness of each non-candidate block, summing up the pulse width modulation duty ratios of all the non-candidate blocks to acquire $\Sigma P$, and calculating a difference value $\Delta P$ between the pulse width modulation duty ratio $P_{total}$ and $\Sigma P$; and acquiring a pulse width modulation duty ratio corresponding to brightness of each candidate block, summing up pulse width modulation duty ratios of all the candidate blocks in a descending order of the pulse width modulation duty ratios of the candidate blocks, until a cumulative sum value is closest to the difference value $\Delta P$ and is less than or equal to the difference value $\Delta P$, and setting candidate blocks of which pulse width modulation duty ratios are summed up as the selected blocks.

7. The method according to claim 6, wherein a pulse width modulation duty ratio corresponding to brightness of each non-candidate block and a pulse width modulation duty ratio corresponding to brightness of each candidate block are acquired respectively through a lookup table.

8. The method according to claim 6, wherein a value of the pulse width modulation duty ratio corresponding to the brightness is accurate to thousands.

9. The method according to claim 1, wherein a backlight characteristic curve of the backlight comprises a Gamma2.2 backlight characteristic curve, a fold line-shaped backlight characteristic curve, or an S-shaped backlight characteristic curve.

10. The method according to claim 1, wherein the backlight comprises a Light Emitting Diode (LED) light source.

11. A backlight module, comprising:

a block division unit configured to divide a backlight into N blocks, where N is an integer greater than 1;

a candidate block determination unit configured to determine whether each of the N blocks satisfies a high current driving start-up condition or not according to a pixel signal in each input frame of signal and set blocks which satisfy the high current driving start-up condition as candidate blocks;

a selected block setting unit configured to set blocks among the candidate blocks which are determined to be driven by high current as selected blocks in a case that power consumption of each frame of picture does not exceed total backlight power consumption without dynamic backlight control; and a calculation unit configured to calculate backlight driving pulse width modulation duty ratios of the selected blocks according to a correspondence between brightness and pulse width modulation duty ratios, and transmit the calculated backlight driving pulse width modulation duty ratios to a backlight driving circuit, to respectively drive the respective selected blocks in the backlight;

wherein the selected block setting unit is further configured to:

calculate a pulse width modulation duty ratio $P_{total}$ of the backlight without dynamic backlight control;

sum up pulse width modulation duty ratios of all the non-candidate blocks based on the pulse width modulation ratio $P_{total}$; and set the selected blocks based on the pulse width modulation ratio $P_{total}$, a sum of the pulse width modulation duty ratios of all the non-candidate blocks, and a pulse width modulation duty ratio corresponding to brightness of each candidate block.

12. The backlight module according to claim 11, wherein the candidate block determination unit comprises:

a pixel brightness calculation unit configured to calculate brightness of a pixel according to the pixel signal;

a first comparison unit configured to compare the brightness of the pixel with a threshold A;

a counting unit configured to increase a count value by 1 when the brightness of the pixel is greater than the threshold A;

a second comparison unit configured to compare the count value with a threshold B;

total brightness calculation unit configured to calculate total brightness $L_{bn}$ of pixels in the block in a case that the count value is greater than or equal to the threshold B;

a third comparison unit configured to compare the total brightness $L_{bn}$ with a threshold C;

a brightness difference calculation unit configured to calculate a brightness difference between the total brightness $L_{bn}$ and total brightness of an adjacent block in a case that the total brightness $L_{bn}$ is greater than the threshold C; and a fourth comparison unit configured to compare the brightness difference with a threshold D and set the block as a candidate block in a case that the brightness difference is greater than the threshold D.

13. The backlight module according to claim 12, wherein the candidate block determination unit further comprises:

a non-candidate block determination unit configured to set the block as a non-candidate block in a case that the count value is less than the threshold B.

14. The backlight module according to claim 13, wherein the non-candidate block determination unit is further configured to set the block as a non-candidate block in a case that the total brightness $L_{bn}$ is less than the threshold C or the brightness difference between the block and the adjacent block is less than the threshold D.

15. The backlight module according to claim 11, wherein the selected block setting unit is further configured to:

acquire a pulse width modulation duty ratio corresponding to brightness of each non-candidate block, sum up pulse width modulation duty ratios of all the non-candidate blocks to acquire $\Sigma P$, and calculate a difference value $\Delta P$ between the pulse width modulation duty ratio $P_{total}$ and $\Sigma P$; and acquire a pulse width modulation duty ratio corresponding to brightness of each candidate block, sum up pulse width modulation duty ratios of all the candidate blocks in a descending order of the pulse width modulation duty ratios of the candidate blocks, until a cumulative sum value is closest to the difference value $\Delta P$ and is less than or equal to the difference value $\Delta P$, and set candidate blocks of which pulse width modulation duty ratios are summed up as the selected blocks.

16. The backlight module according to claim 15, wherein the difference value calculation unit and the setting unit acquire a pulse width modulation duty ratio corresponding to brightness of each non-candidate block and a pulse width modulation duty ratio corresponding to brightness of each candidate block respectively through a lookup table.

17. The backlight module according to claim 11, wherein the block division unit, the candidate block determination unit, the selected block setting unit and the calculation unit are implemented with a Field Programmable Gate Array (FPGA) chip.

18. The backlight module according to claim 11, wherein the backlight comprises a Light Emitting Diode (LED) light source.

19. A display apparatus, comprising the backlight module according to claim 11.

20. The display apparatus according to claim 19, comprising a high dynamic range display apparatus.

\* \* \* \* \*